July 18, 1933. W. KROPP 1,918,406
RAIL AND FLANGE OILER
Filed Aug. 23, 1932 2 Sheets-Sheet 1
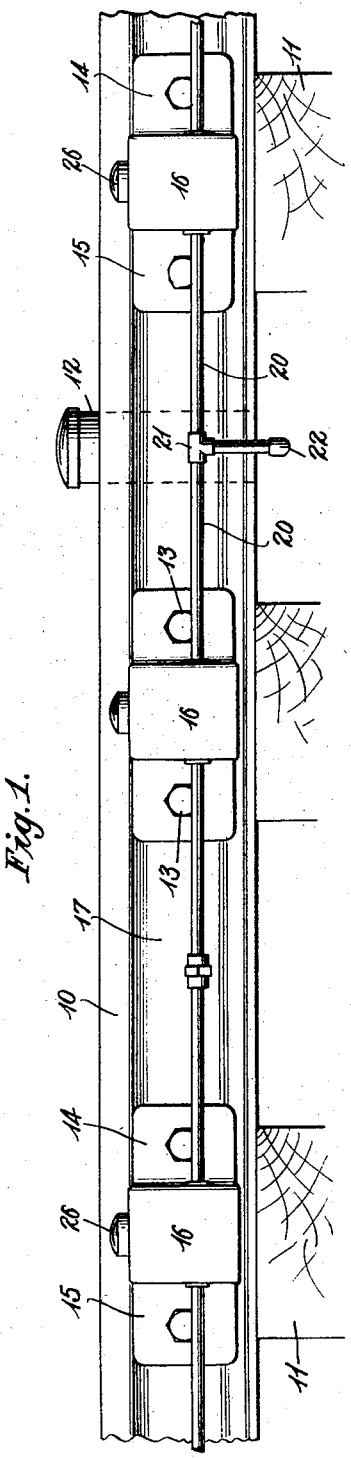
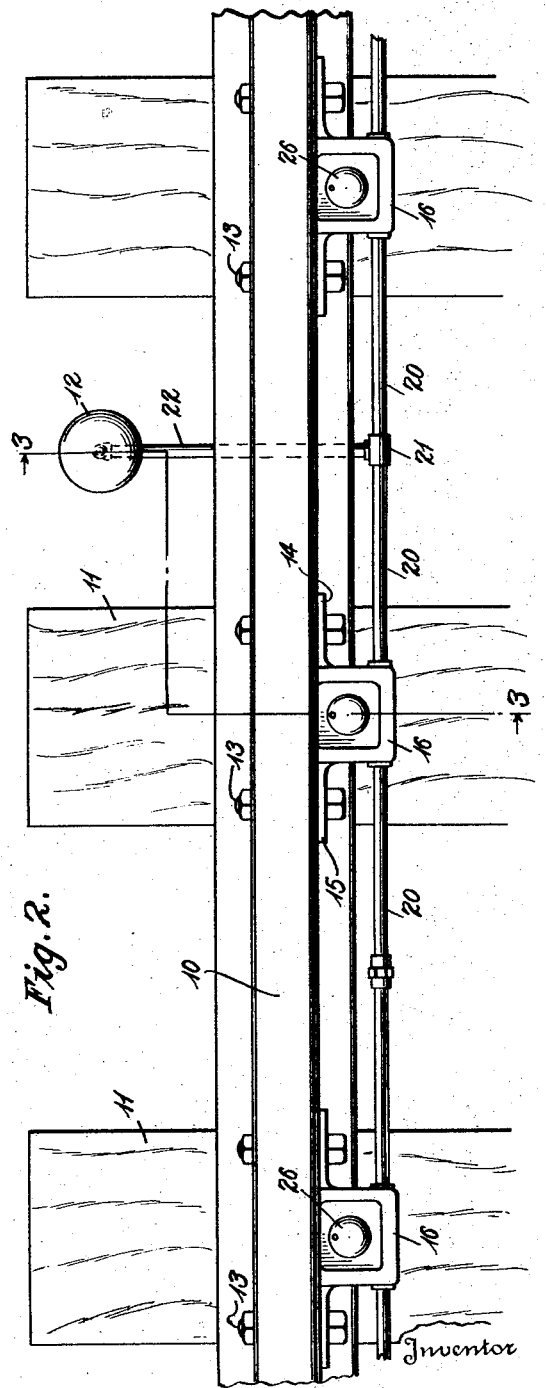
Inventor
William Kropp July 18, 1933.  W. KROPP  1,918,406
RAIL AND FLANGE OILER
Filed Aug. 23, 1932  2 Sheets-Sheet 2
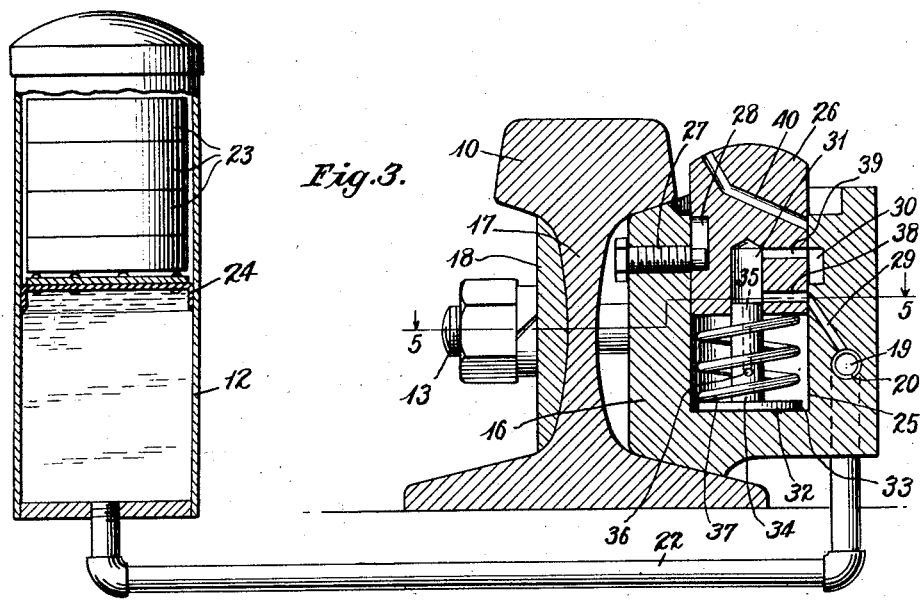
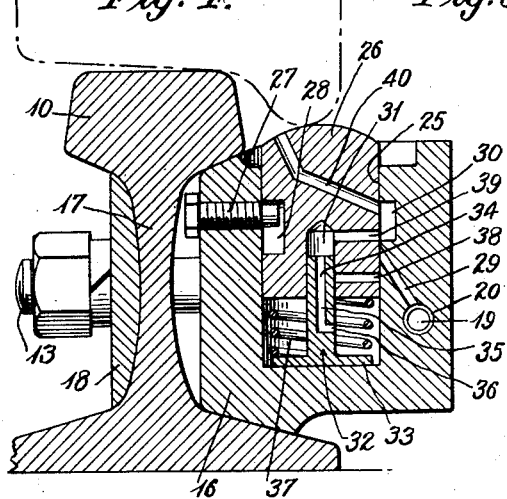
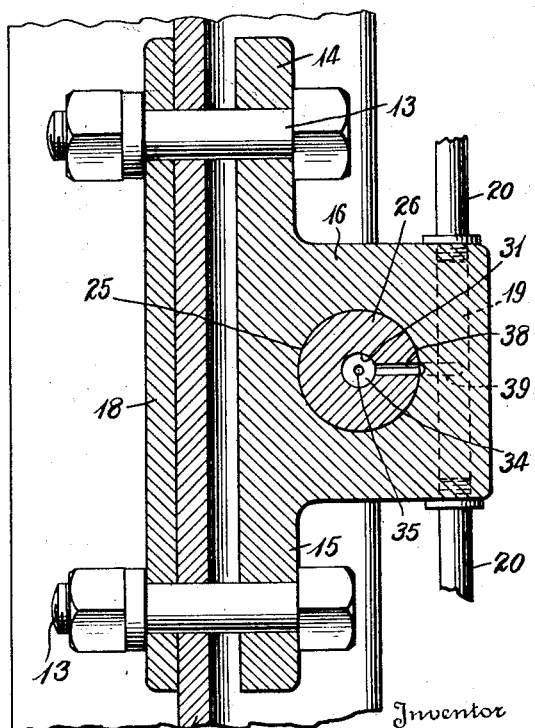
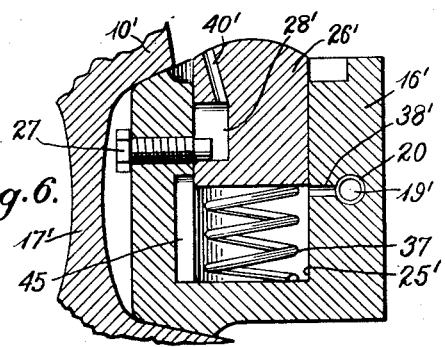
Inventor
William Kropp
By Brower & Phelps
Attorneys Patented July 18, 1933

1,918,406

UNITED STATES PATENT OFFICE

WILLIAM KROPP, OF WEATHERLY, PENNSYLVANIA, ASSIGNOR TO THE RAILS COMPANY, OF NEW YORK, N. Y., A CORPORATION OF CONNECTICUT

RAIL AND FLANGE OILER

Application filed August 23, 1932. Serial No. 630,110.

The invention relates to rail and flange oilers and has as an object the provision of a simple device for applying lubricant to the head of a rail and/or the flange of a passing wheel.

It is an object of the invention to provide a device of this character which will be simple to manufacture and efficient in operation.

It is a further object of the invention to provide a device which may be readily connected in multiple to apply lubricant at several points of the flange of a passing wheel and/or to separated points upon the head of a rail.

It is a further object of the invention to provide an oiler having but one movable part.

It is a further object of the invention to provide an oiler having no valves other than such as are provided by passages within the single movable member of the oiler.

It is a further object of the invention to provide an oiler, which may be fed by a source of lubricant under pressure, of considerable size so as to require attention only at long intervals.

Further objects of the invention will appear from the following description when read in connection with the accompanying drawings showing illustrative embodiments of the invention, and wherein:—

Fig. 1 is a side elevation of a rail with a plurality of the devices applied;

Fig. 2 is a plan view of the structure of Fig. 1;

Fig. 3 is a vertical transverse section on line 3—3 of Fig. 2, upon an enlarged scale;

Fig. 4 is a section through the rail and oiler corresponding to Fig. 3 showing a passing wheel in dotted lines, and showing the oiler piston depressed;

Fig. 5 is a transverse section on line 5—5 of Fig. 3;

Fig. 6 is a detail section through a portion of the oiler body and piston showing a modified arrangement of passages.

In Figures 1 and 2 a plurality of the devices are shown applied to the railway T-rail 10 supported upon ties 11, a receptacle for holding lubricant under pressure being shown at 12.

The device is desirably applied to the inside of the rail by means of bolts 13 passing through flanges 14, 15 projecting from the oiler body 16, said bolts passing through the web 17 of the rail and through a plate 18 upon the inside of the web. The body 16 is formed with a passage 19 to which pipes 20 may be secured and by means of which pipes a plurality of the devices may be connected as indicated in Figures 1 and 2.

By means of a T 21 and a pipe 22 passing under the rail between the ties, the lubricant is conducted from the receptacle 12 to the pipes 20 from which it flows through all of the connected bodies to supply each of them with lubricant under pressure.

Pressure may be placed upon the lubricant in any desired manner as by means of weights 23 in the receptacle resting upon a piston 24 therein. It is obvious that air under pressure might be applied to the receptacle 12 in a well known manner to produce the pressure upon the lubricant.

The oiler body 16 is shown as formed with a cylinder 25 within which a piston 26 is reciprocable between limits of movement determined by a stop screw 27 projecting into a cavity 28. The screw 27 is shown as applied from the inside of the body in order that when the device is in position upon a rail the head of the screw is not accessible to a person desiring to tamper therewith, and therefore the piston 26 cannot be removed from the cylinder without first removing the entire body from the rail.

To conduct lubricant from the passage 19 to the cylinder 25 there is shown a passage 29 opening into the cylinder. The inside of the cylinder is also shown as formed with a cavity 30 for a purpose to be described.

Seating upon the bottom of the cylinder and projecting into a chamber 31 in the piston 26 is a member 32 formed with a head 33 in contact with the bottom end of the cylinder and a stem 34 projecting into the cavity 31, said stem being formed with a central passage 35 and a transverse passage 36 opening into the cylinder below the piston.

To hold the piston in its normal position shown in Figures 3 and 6 a spiral spring 37 seats upon the bottom end of the cylinder or upon the head 33 and acts in compression against the piston, said spring being compressible when the flange of a wheel, as indicated in Figure 4, comes into contact with the projecting upper end of the piston.

To conduct lubricant from the passage 29 to the chamber 31, and thus to the cylinder below the piston through the passages 35, there is shown a passage 38 normally in registry with the passage 29, as shown in Figure 3, but removed from such communication when the piston is depressed. Such depression of the piston also closes the passage 38 by lowering the same below the upper end of the stem 34.

A second passage in the piston 26 is shown at 39 placing the chamber 31 in communication with the cavity 30. An outlet passage 40 is shown through the body of the piston, its lower end being normally out of registry with the cavity 30 and its upper end being turned at such an angle as to direct the lubricant to the point desired.

Upon depression of the piston by a passing wheel the piston is depressed to the position shown in Figure 4 wherein the supply of lubricant from the passage 19 is cut off and the passage 40 is placed into communication with the chamber 31 through passage 39 and cavity 30 and the considerable pressure thus suddenly applied upon the piston and thus upon the confined lubricant will cause a jet of lubricant to flow into the angle between the wheel flange and the head of the rail.

By virtue of the closing of both ends of the passage 38 by its movement out of registry with the passage 29 and to a position opposite the stem 34, a double closure of the passage 38 will result to ensure that no lubricant will be forced back into the pipe 20 against the pressure therein, the pressure produced in the cylinder being considerably greater than that normally present in the receptacle 12.

In the form of the invention shown in Figure 6 the passage 38' normally opens into the cylinder 25' below the piston 26' and in a position to be immediately closed by the piston when depressed. The piston is held normally at its upper position determined by stop screw 27 entering cavity 28' in the piston, by expansible spring 37. A cavity 45 is shown in the wall of the lower portion of the cylinder to perform the function of cavity 30 in the form of Figures 1 to 5. The cavity 28' may be made of such a depth that the passage 40' communicating with its inner end will have such a direction as to deliver the lubricant to the desired point upon the rail head or wheel flange or both.

In this form of the invention depression of the piston will close passage 38' and afterward bring cavity 28' into communication with cavity 45 to cause lubricant to flow from the cylinder 25' below the piston through the cavities and out through passage 40'.

The device is particularly adaptable to application upon rail curves and being readily connected up in multiple, so many thereof as desired may be connected to a single lubricant receptacle 12 to oil a passing wheel at several points in its revolution upon the rail 10 as well as to oil spaced portions of the rail head. There being but one movable part, namely, the piston 26, with no spring pressed valves, the devices is little liable to derangement and is very simple to manufacture and assemble.

Minor changes may be made in the physical embodiments of the invention within the scope of the appended claims without departing from the spirit of the invention.

I claim:

1. A rail and flange oiler comprising, in combination: a body for attachment to a rail having a cylinder therein and a passage to conduct lubricant under pressure to said cylinder, positioned to be closed by a piston reciprocating in the cylinder; a piston reciprocable in said cylinder and provided with an outlet passage; the wall of said cylinder formed with a cavity in communication with the interior of the cylinder, normally out of comunication with said outlet passage and positioned to be brought into communication with the outlet passage by reciprocation of the piston; and a spring to yieldingly hold the piston in normal position.

2. A rail and flange oiler comprising, in combination: a body for attachment to a rail having a cylinder therein, a cavity in its wall, and a passage to conduct lubricant under pressure to the cylinder positioned to be closed by reciprocation of a piston in the cylinder; a piston reciprocable in the cylinder having therein a cavity and an outlet passage; a spring acting in compression to yieldingly hold the piston in normal position; depression of the piston acting to close said inlet passage, and to open an outlet passage through said cavities and said piston carried passage; said cavities being normally held out of communication by a portion of said piston.

3. A rail and flange oiler comprising, in combination: a body for attachment to a rail having a cylinder therein, an inlet passage for reception of lubricant under pressure and a cavity, said passage and cavity each opening into the cylinder; a piston reciprocable in the cylinder having a chamber open at the lower end thereof, a passage normally connecting the first named passage with said chamber, a second passage connecting said chamber and cavity and an outlet passage passing through the piston one end normally out of register with said cavity and its other end opening and directed to deliver lubricant to the rail head; a spring acting under compression in said cylinder to hold said piston in normal position in the path of movement of wheels moving on said rail; depression of said piston by a passing wheel closing said inlet passage, bringing said outlet passage and second named passage into communication through said cavity and by piston-applied pressure on lubricant in the cylinder and chamber forcing lubricant from said outlet passage.

4. A rail and flange oiler comprising, in combination: a body for attachment to a rail having a cylinder therein formed with a cavity in its wall and an inlet passage positioned to be closed by reciprocation of a piston in the cylinder; a piston reciprocable in the cylinder yieldably held at its outer limit of travel by a spring under compression; said piston formed with a cavity normally out of communication with said cylinder cavity but placed into such communication upon depression of the piston and an outlet passage from said cavity directed to deliver lubricant compressed by depression of the piston, to the desired point.

5. A rail and flange oiler comprising, in combination: a body for attachment to a rail having a cylinder therein formed with a cavity in its wall and an inlet passage positioned to be closed by reciprocation of a piston in the cylinder; a piston reciprocable in the cylinder yieldably held at its outer limit of travel by a spring under compression; said piston formed with a cavity normally out of comunication with said cylinder cavity but placed into such communication upon depression of the piston and an outlet passage from said cavity directed to deliver lubricant compressed by depression of the piston, to the desired point.

WILLIAM KROPP.